(12) United States Patent
Kanada et al.

(10) Patent No.: US 9,944,164 B2
(45) Date of Patent: Apr. 17, 2018

(54) POWER TRANSMITTING APPARATUS FOR HYBRID VEHICLE

(71) Applicant: TOYOTA JIDOSHA KABUSHIKI KAISHA, Toyota-shi, Aichi-ken (JP)

(72) Inventors: Toshiki Kanada, Anjo (JP); Ryuji Ibaraki, Miyoshi (JP); Yuji Yasuda, Miyoshi (JP); Atsushi Tabata, Okazaki (JP); Tatsuya Imamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 15/021,453

(22) PCT Filed: Sep. 11, 2014

(86) PCT No.: PCT/IB2014/001787
§ 371 (c)(1),
(2) Date: Mar. 11, 2016

(87) PCT Pub. No.: WO2015/036838
PCT Pub. Date: Mar. 19, 2015

(65) Prior Publication Data
US 2016/0214473 A1    Jul. 28, 2016

(30) Foreign Application Priority Data

Sep. 13, 2013  (JP) ................................. 2013-190958

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *B60K 6/405* (2013.01); *B60K 6/445* (2013.01);
(Continued)

(58) Field of Classification Search
CPC .......... B60K 6/365; B60K 6/54; B60K 6/445; F16H 3/724; F16H 3/727;
(Continued)

(56) References Cited

U.S. PATENT DOCUMENTS 5,482,512 A * 1/1996 Stevenson .............. B60K 6/485
188/70 B
9,683,658 B2 * 6/2017 Kanada .................. B60K 6/365
(Continued)

FOREIGN PATENT DOCUMENTS

CN         101018685 A    8/2007
JP         S58-196364 A   11/1983
(Continued)

*Primary Examiner* — Roger L Pang
(74) *Attorney, Agent, or Firm* — Oliff PLC

(57) ABSTRACT

A power transmitting apparatus includes a transmission gear mechanism and a power split mechanism including a first rotation element connected to a first input member, a second rotation element connected to a rotary machine, and a third rotation element connected to the drive shaft via a first output member. The transmission gear mechanism is configured to transmit a torque to the first input member and the first rotation element via a second output member. The transmission gear mechanism and the power split mechanism are arranged on the same rotation axis as an output shaft of an engine. The transmission gear mechanism and the power split mechanism are arranged in the order of the transmission gear mechanism and the power split mechanism from the side closer to the engine. The second output member and the first input member are connected to each other by a spline or a serration.

6 Claims, 12 Drawing Sheets

(51) Int. Cl.
*B60K 6/405* (2007.10)
*B60K 6/445* (2007.10)
*B60K 6/54* (2007.10)
*F16H 3/72* (2006.01)
*F16H 37/08* (2006.01)
*B60K 6/38* (2007.10)

(52) U.S. Cl.
CPC ............. *B60K 6/54* (2013.01); *F16H 3/724* (2013.01); *F16H 37/0833* (2013.01); *B60K 2006/381* (2013.01); *B60Y 2200/92* (2013.01); *B60Y 2400/73* (2013.01); *B60Y 2400/80* (2013.01); *F16H 3/727* (2013.01); *F16H 2037/0866* (2013.01); *F16H 2200/201* (2013.01); *F16H 2200/2007* (2013.01); *F16H 2200/2035* (2013.01); *Y02T 10/6239* (2013.01); *Y02T 10/76* (2013.01); *Y10S 903/91* (2013.01); *Y10S 903/917* (2013.01)

(58) Field of Classification Search
CPC ..... F16H 2200/2007; F16H 2200/2035; Y10S 903/91; Y10S 903/917; Y02T 10/6239
USPC ............................................ 475/5; 74/606 R
See application file for complete search history.

(56) References Cited

U.S. PATENT DOCUMENTS

| | | | |
|---|---|---|---|
| 2005/0204537 A1* | 9/2005 | Reed | B60K 6/26 29/469 |
| 2007/0225098 A1 | 9/2007 | Tabata et al. | |
| 2010/0125016 A1* | 5/2010 | Kempf | B60K 6/405 475/149 |
| 2010/0130321 A1* | 5/2010 | Eto | B60K 6/365 475/5 |
| 2010/0179010 A1* | 7/2010 | Kuzuya | B60K 6/365 475/5 |
| 2013/0090202 A1 | 4/2013 | Hiraiwa | |
| 2015/0072819 A1 | 3/2015 | Ono et al. | |
| 2016/0159212 A1* | 6/2016 | Omuro | B60K 6/365 475/5 |

FOREIGN PATENT DOCUMENTS

| | | |
|---|---|---|
| JP | 2006-298066 A | 11/2006 |
| JP | 2008-120233 A | 5/2008 |
| JP | 2008-120234 A | 5/2008 |
| JP | 2008-265598 A | 11/2008 |
| JP | 2008-265600 A | 11/2008 |
| JP | 2009-173282 A | 8/2009 |
| JP | 2013-082317 A | 5/2013 |
| JP | 2013-095386 A | 5/2013 |
| JP | 2013-112318 A | 6/2013 |
| WO | 2013/114595 A1 | 8/2013 |

* cited by examiner

FIG. 3

| | FORWARD/REVERSE | SINGLE MOTOR | | C1 | B1 | MG1 | MG2 |
|---|---|---|---|---|---|---|---|
| EV | | | DRIVE | | | G | M |
| | | | PARRAREL USE OF ENGINE BRAKE | △ | △ | G | M |
| | | DOUBLE MOTOR | | ○ | ○ | M | M |
| HV | FORWARD | | O/D (High) | | ○ | G | M |
| | | | DIRECTLY CONNECTED (Low) | ○ | | G | M |
| | REVERSE | | DIRECTLY CONNECTED (Low) | ○ | | G | M |

○: COUPLED   △: ONE OF THEM IS COUPLED IN PARRAREL USE OF ENGINE BRAKE
G: MAINLY GENERATOR   M: MAINLY MOTOR, BUT GENERATOR IN REGENERATION

POWER TRANSMITTING APPARATUS FOR HYBRID VEHICLE

BACKGROUND OF THE INVENTION

1. Field of the Invention

The present invention relates to a power transmitting apparatus that is mounted on a hybrid vehicle including plural drive sources having different power generation principles.

2. Description of Related Art

A hybrid vehicle is a vehicle including plural drive sources having different power generation principles, such as an engine for converting thermal energy into kinetic energy to generate dynamic power and a rotary machine having an energy regeneration function, as drive sources for traveling. The hybrid vehicle is a vehicle including an internal combustion engine such as a gasoline engine or a diesel engine and a rotary machine such as an electric motor having a power generation function or a hydraulic motor having a pressure accumulating function as drive sources. In addition, the hybrid vehicle is a vehicle that can improve energy efficiency and reduce an amount of exhaust gas by effectively using characteristics of the engine and the rotary machine. An example of such a hybrid vehicle is described in Japanese Patent Application Publication No. 2008-120234 (JP 2008-120234 A).

A hybrid drive device described in JP 2008-120234 A includes an engine, a first motor having a function of generating electric power with the dynamic power of the engine, and a second motor outputting dynamic power to an output member with the electric power generated by the first motor as drive sources. The first motor and the second motor are arranged on the same axis and a power split mechanism that splits the dynamic power output from the engine to the first motor side and the output member side is disposed between the first motor and the second motor. In the hybrid drive device described in JP 2008-120234 A, a transmission gear device changes a rotation speed of the engine and transmits a torque to the power split mechanism. The transmission gear device is disposed between the first motor and the second motor.

Japanese Patent Application Publication No. 2008-265598 (JP 2008-265598 A) describes a hybrid vehicle having a power split mechanism that includes an engine, a first motor, a second motor, and a planetary gear unit having three rotation elements. The hybrid vehicle described in JP 2008-265598 A further includes a clutch that fixes the output shaft of the engine so as not to be rotatable. The first motor is connected to the output shaft of the engine via the power split mechanism and the second motor is connected to driving wheels. The operations of the engine, the first motor, the second motor, and the clutch are controlled on the basis of a driving force required for the vehicle. The hybrid vehicle is configured to perform motor-driven traveling in which both the first motor and the second motor are driven in a state where the power split mechanism is made to serve as a deceleration mechanism or an acceleration mechanism by engaging the clutch to fix the output shaft of the engine.

Japanese Patent Application Publication No. 2008-265600 (JP 2008-265600 A) describes the same configuration as the hybrid vehicle described in JP 2008-265598 A. JP 2008-265600 A describes that the operation of the engine is stopped and the rotation of the two motors are controlled using a map in which torque split for most efficiently driving the two motors is defined on the basis of an accelerator operation amount, a vehicle speed, and a gear ratio of a transmission when a condition in which the clutch is engaged to fix the crank shaft of the engine so as not to be rotatable is established.

The hybrid drive device described in JP 2008-120234 has a configuration in which a transmission gear mechanism for changing the rotation speed of the engine is added to the configuration of the power transmitting apparatus for a hybrid vehicle in the related art including the engine, the electric motor, and the power split mechanism. By employing this configuration, it is possible to operate the engine at a rotation speed more advantageous in fuel efficiency depending on a required driving force or a traveling state. Accordingly, it is possible to improve the energy efficiency of the hybrid vehicle.

On the other hand, the transmission gear mechanism includes a gear mechanism and a clutch or a brake for controlling the transmission. Accordingly, compared with a power transmitting apparatus for a hybrid vehicle in the related art not having such a transmission gear mechanism, the number of components increases or the number of assembly steps increases to correspond to the addition of the transmission gear mechanism. As a result, the assembly of the apparatus may be complicated and the productivity thereof may be lowered.

SUMMARY OF THE INVENTION

The present invention provides a power transmitting apparatus for a hybrid vehicle that can simplify an apparatus assembling procedure and improve productivity even with a configuration in which a transmission gear mechanism for changing a rotation speed of an engine is added to an apparatus according to the related art.

According to an aspect of the present invention, a power transmitting apparatus has the following configurations. The power transmitting apparatus is for a hybrid vehicle, in which the hybrid vehicle includes an engine and at least one rotary machine as drive sources. The power transmitting apparatus includes a power split mechanism and a transmission gear mechanism. The power split mechanism is constituted by a differential device. The power split mechanism is configured to split or combine and transmit dynamic power between the drive sources and a drive shaft. The differential device includes three rotation elements. The three rotation elements includes a first rotation element that is connected to a first input member, a second rotation element that is connected to the rotary machine, and a third rotation element that is connected to the drive shaft via a first output member. The transmission gear mechanism is configured to change a rotation speed of the engine input via a second input member. The transmission gear mechanism is configured to transmit a torque to the first input member and the first rotation element via a second output member. The transmission gear mechanism and the power split mechanism are disposed on the same rotation axis as an output shaft of the engine. The transmission gear mechanism and the power split mechanism are arranged in the order of the transmission gear mechanism and the power split mechanism from the side closer to the engine. The second output member and the first input member are connected to each other by a spline or a serration.

In the power transmitting apparatus according to the present invention, the transmission gear mechanism for changing the rotation speed of the engine is disposed between the engine and the power split mechanism. In the present invention, the output member of the transmission gear mechanism and the input member of the power split mechanism are connected to each other by a spline or a serration. This is a configuration for preventing assemblability or productivity of the apparatus from being lowered by providing the transmission gear mechanism. Therefore, according to the present invention, when assembling the power transmitting apparatus, the power split mechanism and the transmission gear mechanism can be easily connected to each other so as to enable power transmission by causing the power split mechanism and the transmission gear mechanism to relatively move in the rotation axis direction.

The housing houses the power split mechanism and the rotary machine and is an important part of the power transmitting apparatus. Particularly, the transmission gear mechanism, the input member and the output member of the transmission gear mechanism, and the like can be sub-assembled as a transmission gear unit to the housing. Accordingly, by attaching the transmission gear unit from the rotation axis direction to the housing, it is possible to easily assemble the housing and the transmission gear unit. The transmission gear unit houses the transmission gear mechanism, and the housing houses the power split mechanism, the rotary machine, and the like. In this case, the spline or the serration is formed in connecting parts of the output member of the transmission gear mechanism and the input member of the power split mechanism as described above. Accordingly, the housing that houses the power split mechanism and the transmission gear unit housing the transmission gear mechanism can be easily and satisfactorily assembled. As a result, it is possible to improve assemblability or productivity of the power transmitting apparatus including the transmission gear mechanism and the power split mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a table showing operating states of a clutch, a brake, and motor-generators in operating conditions of the drivetrain illustrated in FIGS. 1, 2;

DETAILED DESCRIPTION OF EMBODIMENTS

Hereinafter, the present invention will be described in detail with reference to the accompanying drawings. A power transmitting apparatus according to the present invention is mounted on a vehicle having an engine for converting thermal energy into kinetic energy to generate dynamic power and a rotary machine (e.g., electric motor) capable of regenerating energy as a drive source, that is, a hybrid vehicle including plural drive sources having different power generation principles.

A gasoline engine is generally used as an engine of the hybrid vehicle. In addition, the engine in the present invention may employ an internal combustion engine using a fuel other than gasoline, such as a diesel engine or an LPG engine. On the other hand, a motor having a power generation function (that is, a motor-generator) is generally used as a rotary machine. In addition, the rotary machine in the present invention may employ a pressure motor having a function of accumulating a pressure such as an oil pressure or an air pressure, a flywheel capable of accumulating and discharging rotational energy, or the like.

The hybrid vehicle to which the present invention is applied is configured to select an "engine-driven traveling mode" or a "hybrid (HV) traveling mode" in which the hybrid vehicle travels with dynamic power output from the engine and a traveling mode in which the hybrid vehicle travels with dynamic power output from the rotary machine. Particularly, when a motor is used as the rotary machine, the hybrid vehicle is configured to select the "engine-driven traveling mode" and a "motor-driven traveling mode" in which the hybrid vehicle travels by driving the motor with electric power accumulated in a battery.

Figure 1:
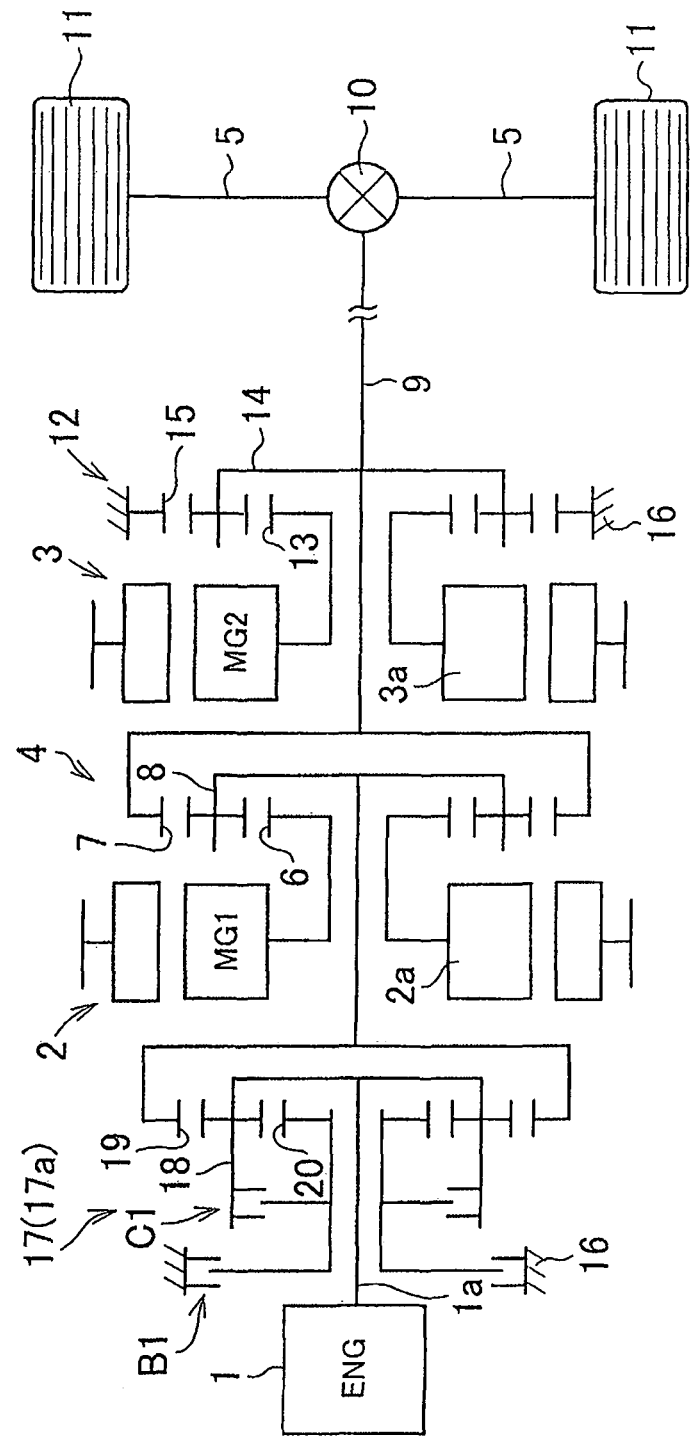
FIG. 1 is a skeleton diagram illustrating a drivetrain of a hybrid vehicle to which the present invention is applied and is a diagram illustrating an example of a drivetrain in which a transmission gear mechanism is constituted by a single-pinion planetary gear unit and which can be suitably mounted on an FR type vehicle.

An example of a powertrain of a hybrid vehicle to which the present invention can be applied is illustrated in FIG. 1. The example illustrated in the drawing is a so-called two-motor hybrid vehicle Ve having an engine (ENG) 1 and two rotary machines of a first motor-generator (MG1) 2, and a second motor-generator (MG2) 3 as drive sources. The hybrid vehicle Ve is configured to split and transmit dynamic power output from the engine 1 to the first motor-generator 2 side and a drive shaft 5 side by the use of a power split mechanism 4. The hybrid vehicle Ve is also configured to supply electric power generated from the first motor-generator 2 to the second motor-generator (MG2) 3 and to add dynamic power output from the second motor-generator 3 with the electric power to the drive shaft 5.

The power split mechanism 4 is constituted by a differential mechanism including three rotation elements. Specifically, the power split mechanism 4 is constituted by a planetary gear unit having a sun gear, a carrier, and a ring gear. In the example illustrated in FIG. 1, a single-pinion planetary gear unit is used.

The planetary gear unit constituting the power split mechanism 4 is disposed on the same axis as the engine 1. The first motor-generator 2 is connected to the sun gear 6 of the planetary gear unit. That is, a rotor 2a of the first motor-generator 2 is connected to the sun gear 6. The ring gear 7 is disposed in a concentric circle with the sun gear 6. A pinion gear engaging with the sun gear 6 and the ring gear 7 is supported by the carrier 8 so as to rotate and revolve. An output shaft 1a of the engine 1 is connected to the carrier 8 via a transmission gear mechanism 17 to be described later. One end of a propeller shaft 9 is connected to the ring gear 7. The other end of the propeller shaft 9 is connected to a drive shaft 5 and driving wheels 11 via a differential gear 10.

A torque output from the second motor-generator 3 can be added to the torque transmitted from the power split mechanism 4 to the propeller shaft 9 and the driving wheels 11. Specifically, the second motor-generator 3 is disposed on the same rotation axis as the engine 1 and the second motor-generator 3 is connected to the propeller shaft 9 via a gear train 12.

In the example illustrated in FIG. 1, a single planetary type planetary gear unit is used for the gear train 12. A sun gear 13 of the planetary gear unit constituting the gear train 12 is connected to the rotor 3a of the second motor-generator 3. A carrier 14 is connected to the propeller shaft 9. A ring gear 15 is fixed to a fixing member 16 such as a casing so as not to rotate. That is, in the gear train 12, the ring gear 15 serves as a fixed element. The carrier 14, which serves as an output element when the sun gear 13 serves as an input element, rotates at a rotation speed lower than that of the sun gear 13 in the same direction as the sun gear 13. Accordingly, the gear train 12 serves as a deceleration mechanism at the time of outputting the torque input to the sun gear 13 from the carrier 14. That is, the gear train 12 is configured to amplify the torque input from the second motor-generator 3 to the sun gear 13 and to transmit the amplified torque to the propeller shaft 9.

The first motor-generator 2 and the second motor-generator 3 are connected to a battery via controllers such as inverters not illustrated, respectively. The currents of both the first motor-generator 2 and the second motor-generator 3 are controlled so as to serve as a motor or a power generator. On the other hand, the degree of throttle opening or the ignition time of the engine 1 can be controlled. The engine 1 is configured to control automatic stopping, starting, and restarting of a combustion operation.

In the hybrid vehicle Ve to which the present invention is applied, the transmission gear mechanism 17 is disposed between the engine 1 and the power split mechanism 4 and the first motor-generator 2. The transmission gear mechanism 17 is configured to be switched to a directly connected state and an acceleration state, that is, an overdrive (O/D) state. In the example illustrated in FIG. 1, the transmission gear mechanism 17 is constituted by a single-pinion planetary gear unit 17a. A carrier 18 of the planetary gear unit 17a is connected to the output shaft 1a of the engine 1. A ring gear 19 is connected to the carrier 8 of the power split mechanism 4 so as to rotate together. A clutch C1 for selectively connecting a sun gear 20 and the carrier 18 is disposed between the sun gear 20 and the carrier 18. A brake B1 for selectively fixing the sun gear 20 so as not to rotate is provided. The clutch C1 and the brake B1 can be constituted, for example, by a frictional engaging mechanism being engaged by an oil pressure.

In the transmission gear mechanism 17, the sun gear 20 and the carrier 18 of the planetary gear unit 17a are connected to each other by engaging the clutch C1. As a result, the entire planetary gear unit 17a rotates as a unified body and a so-called directly connected state in which an acceleration operation and a deceleration operation are not performed is realized. By engaging the brake B1 in addition to the clutch C1, the entire transmission gear mechanism 17 is fixed as a unified body and the rotations of the carrier 8 of the power split mechanism 4 and the engine 1 are stopped. On the other hand, by engaging only the brake B1, the sun gear 20 of the transmission gear mechanism 17 serves as a fixed element and the carrier 18 serves as an input element. Accordingly, the ring gear 19 serving as an output element when the carrier 18 serves as an input element rotates at a rotation speed higher than that of the carrier 18 in the same direction as the carrier 18. Accordingly, the transmission gear mechanism 17 serves as an acceleration mechanism. That is, the transmission gear mechanism 17 is set to the O/D state.

The hybrid vehicle Ve illustrated in FIG. 1 is configured to transmit a drive torque output from a drive source to the drive shaft 5 and the driving wheels 11 via the propeller shaft 9. That is, an example of a drivetrain that can be suitably mounted on a so-called FR type hybrid vehicle Ve in which the drive source is disposed on the front side of the vehicle and the driving force is generated from the rear wheels is illustrated. On the other hand, the present invention may be applied to a so-called FF type hybrid vehicle Ve in which the drive source is disposed on the front side of the vehicle and the driving force is generated from the front wheels. An example of the drivetrain that can be suitably mounted on the FF type vehicle is illustrated in FIG. 2.

Figure 2:
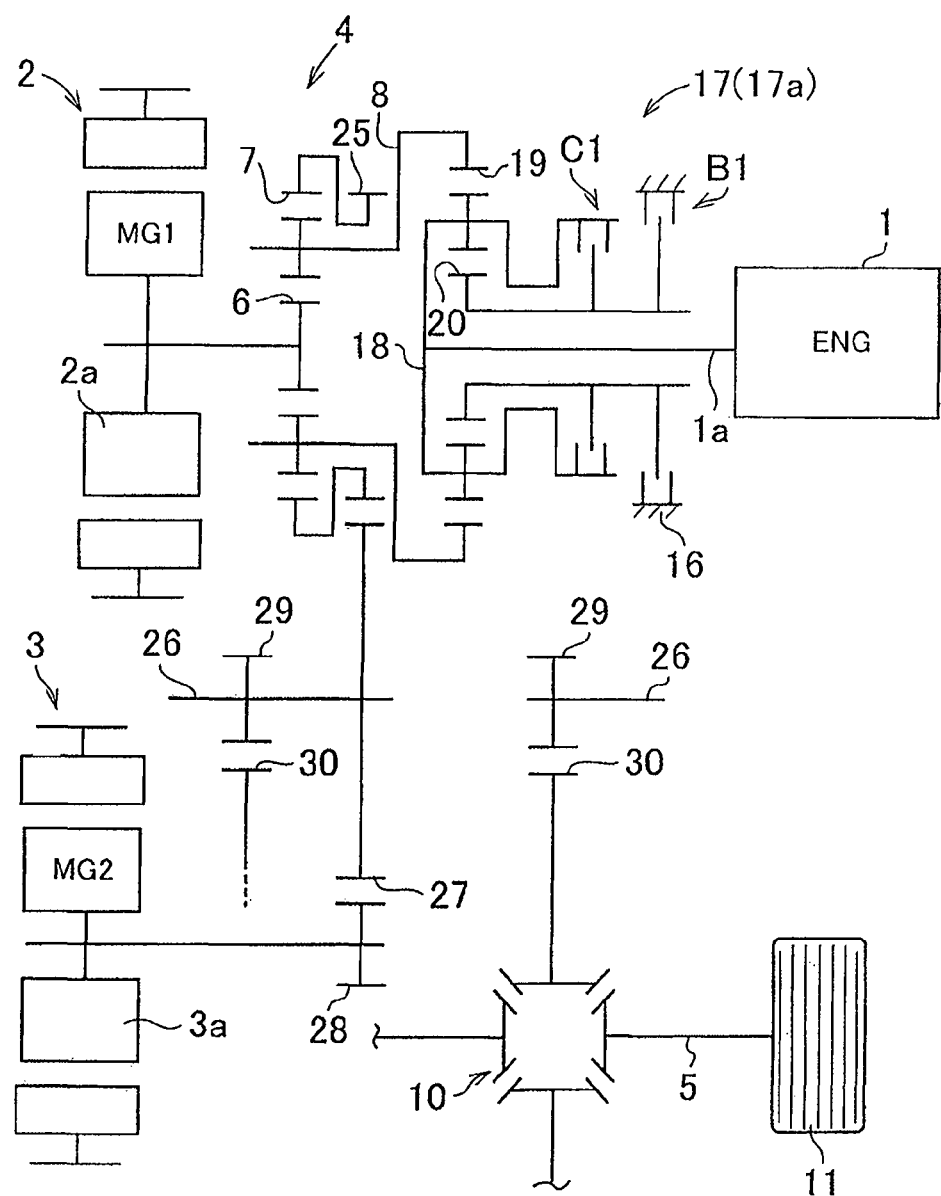
FIG. 2 is a skeleton diagram illustrating a drivetrain of a hybrid vehicle to which the present invention is applied and is a diagram illustrating an example of a drivetrain in which a transmission gear mechanism is constituted by a single-pinion planetary gear unit and which can be suitably mounted on an FF type vehicle.

The hybrid vehicle Ve illustrated in FIG. 2 includes an engine 1, a first motor-generator 2, and a second motor-generator 3 as drive sources, similarly to the example illustrated in FIG. 1. The hybrid vehicle Ve includes a transmission gear mechanism 17, a power split mechanism 4, and a gear train 12. The transmission gear mechanism 17 includes a single-pinion planetary gear unit 17a, a clutch C1, and a brake B1, similarly to the example illustrated in FIG. 1. The carrier 18 of the planetary gear unit 17a is connected to the output shaft 1a of the engine 1. The ring gear 19 is connected to the carrier 8 of the power split mechanism 4. On the other hand, in the example illustrated in FIG. 2, the ring gear 7 of the power split mechanism 4 is connected to a drive gear 25. The gear train 12 includes the drive gear 25, a counter shaft 26, a counter driven gear 27, a reduction gear 28, and a differential drive gear 29.

Specifically, the counter shaft 26 is disposed to be parallel to the rotation axis of the engine 1, the power split mechanism 4, and the like. The counter driven gear 27 engaging with the drive gear 25 is attached to the counter shaft 26 so as to rotate together. A torque output from the second motor-generator 3 can be added to the torque transmitted from the power split mechanism 4 to the drive shaft 5. That is, the second motor-generator 3 is disposed to be parallel to the counter shaft 26, and the reduction gear 28 connected to the rotor 3a thereof engages with the counter driven gear 27. The reduction gear 28 is constituted by a gear having a diameter smaller than that of the counter driven gear 27. Accordingly, the gear train 12 serves as a deceleration mechanism at the time of transmitting the torque input to the reduction gear 28 to the counter shaft 26 via the counter driven gear 27. That is, the gear train 12 is configured to amplify the torque output from the second motor-generator 3 and to transmit the amplified torque to the counter shaft 26.

The differential drive gear 29 is attached to the counter shaft 26 so as to rotate together. In the example illustrated in FIG. 2, a ring gear 30 is formed on the outer circumference of the differential gear 10. The differential drive gear 29 engages with the ring gear 30 formed on the differential gear 10. Accordingly, the torque input to the power split mechanism 4 and output from the ring gear 7 and the torque output from the second motor-generator 3 are transmitted to the drive shaft 5 and the driving wheels 11 via the gear train 12 and the differential gear 10. In FIG. 2, for the purpose of convenience in preparation of the drawing, the position of the differential gear 10 is deviated to the right side in FIG. 2.

Figure 4:
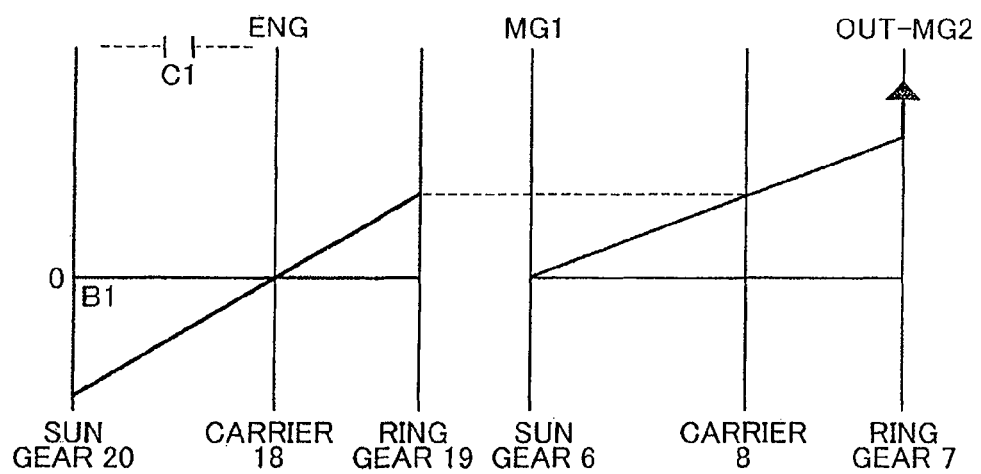
FIG. 4 is a nomograph of a power split mechanism and a transmission gear mechanism in the drivetrain illustrated in FIGS. 1, 2 and is a diagram illustrating a state where the hybrid vehicle travels with only the output of a second motor-generator.

The traveling modes of the hybrid vehicles Ve illustrated in FIGS. 1, 2 or the engaged and disengaged states of the clutch C1 and the brake B1 in the reverse traveling state, and the operating states of the first motor-generator 2 and the second motor-generator 3 are shown in the table of FIG. 3. Briefly speaking about the operating states, "EV" in FIG. 3 represents a motor-driven traveling mode. In a "single-motor-driven traveling mode", both the clutch C1 and the brake B1 are disengaged. The second motor-generator 3 serves as a motor (M), and the first motor-generator 2 serves as a power generator (G). In this case, the first motor-generator 2 may idle. This state is illustrated in the nomograph of FIG. 4. When an engine braking effect is caused in the "single-motor-driven traveling mode", one of the clutch C1 and the brake B1 is engaged and the rotation speed of the ring gear 7 in the power split mechanism 4 is suppressed.

Figure 5:
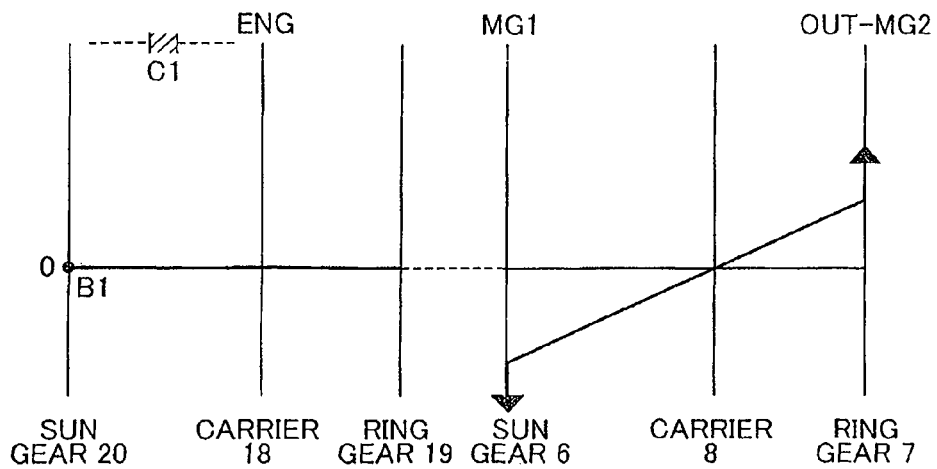
FIG. 5 is a nomograph of a power split mechanism and a transmission gear mechanism in the drivetrain illustrated in FIGS. 1, 2 and is a diagram illustrating a state where the hybrid vehicle travels using the outputs of both the first motor-generator and the second motor-generator.

In a "double-motor-driven traveling mode" of the motor-driven traveling mode, both the first motor-generator 2 and the second motor-generator 3 serve as a motor. In order to transmit the torque output from the first motor-generator 2 to the drive shaft 5, both the clutch C1 and the brake B1 are engaged and the carrier 8 of the power split mechanism 4 is fixed so as not to rotate. In this state, the gear ratios of the rotation elements are set so that the power split mechanism 4 serves as a deceleration mechanism. Accordingly, in this case, the torque output from the first motor-generator 2 is amplified and is transmitted from the ring gear 7 of the power split mechanism 4 to the propeller shaft 9. This state is illustrated in the nomograph of FIG. 5.

Figure 6:
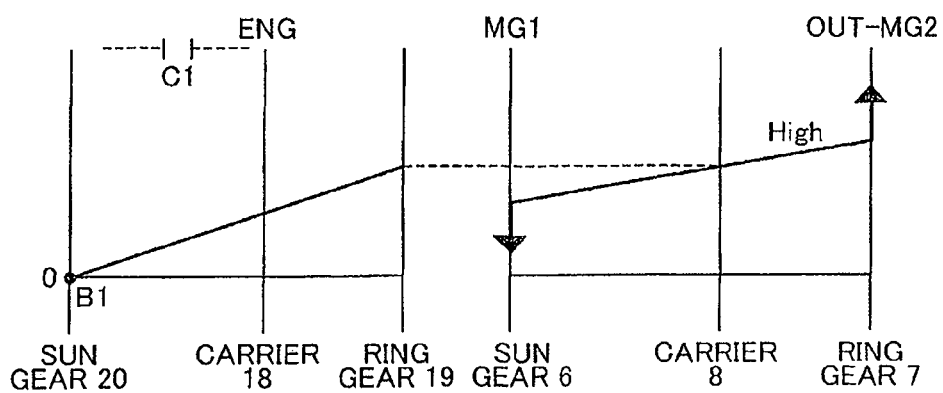
FIG. 6 is a nomograph of a power split mechanism and a transmission gear mechanism in the drivetrain illustrated in FIGS. 1, 2 and is a diagram illustrating a state where the transmission gear mechanism is set to a overdrive (O/D) state (High) and the hybrid vehicle travels with the output of an engine.
Figure 7:
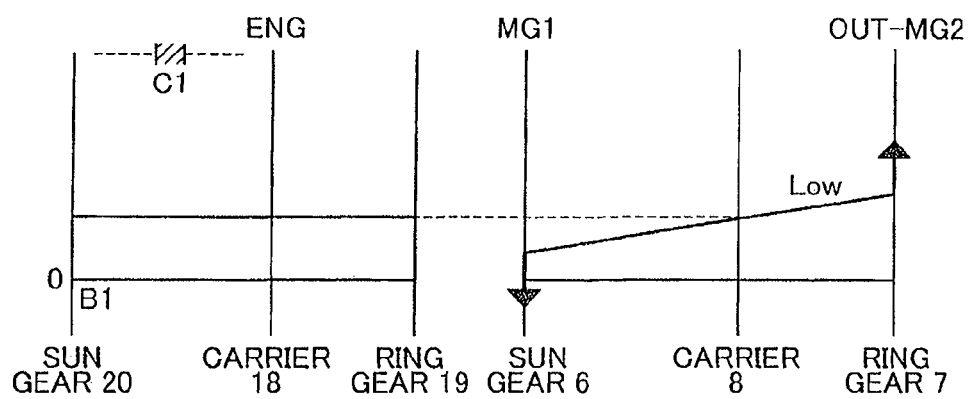
FIG. 7 is a nomograph of a power split mechanism and a transmission gear mechanism in the drivetrain illustrated in FIGS. 1, 2 and is a diagram illustrating a state where the transmission gear mechanism is set to a directly connected state (Low) and the hybrid vehicle travels with the output of an engine.

On the other hand, "HV" in the table of FIG. 3 represents a hybrid operating state in which the engine 1 is operated. In a state where the hybrid vehicle Ve travels with a small load at a middle or high vehicle speed, the transmission gear mechanism 17 is set to the O/D state (High). That is, the clutch C1 is disengaged and the brake B1 is engaged. This state is illustrated in the nomograph of FIG. 6. In this state, as described above, the engine rotation speed is controlled to a rotation speed at which the fuel efficiency is good by the first motor-generator 2. In this case, the electric power generated by causing the first motor-generator 2 to serve as a power generator is supplied to the second motor-generator 3. As a result, the second motor-generator 3 serves as a motor and outputs a drive torque. When a large driving force is required such as when the accelerator operation amount increases at a low vehicle speed, the transmission gear mechanism 17 is controlled to the directly connected state (Low). That is, the clutch C1 is engaged and the brake B1 is disengaged. As a result, the entire transmission gear mechanism 17 rotates as a unified body. This state is illustrated in the nomograph of FIG. 7. In this case, similarly to the O/D state (High), the first motor-generator 2 serves as a power generator and the second motor-generator 3 serves as a motor.

Figure 8:
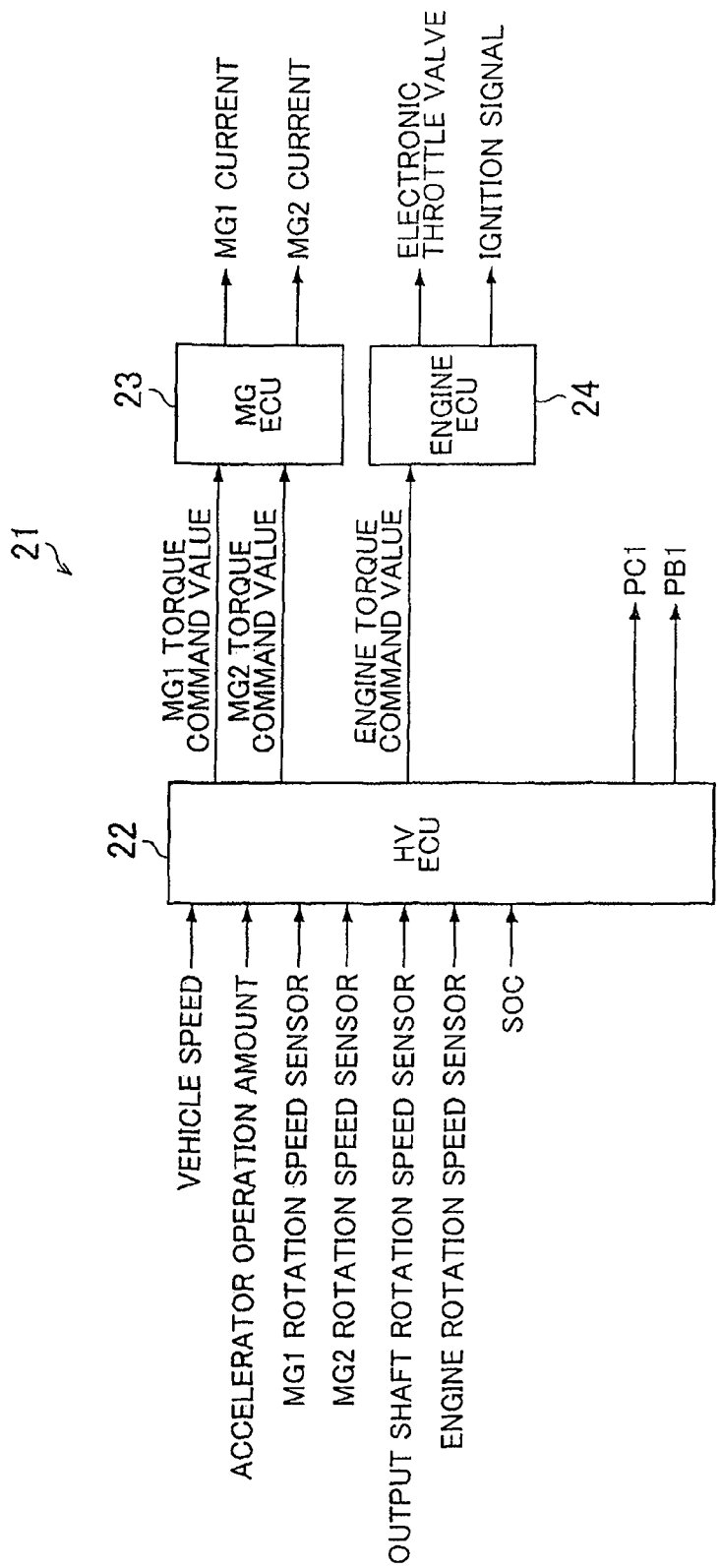
FIG. 8 is a block diagram illustrating a control system of the hybrid vehicle to which the present invention is applied.

An electronic control unit (ECU) 21 that performs the operation control of the engine 1, the operation control of the first motor-generator 2 and the second motor-generator 3, and the engaging and disengaging control of the clutch C1 and the brake B1 is provided. The control system of the ECU 21 is illustrated in the block diagram of FIG. 8.

The ECU 21 includes a hybrid control unit (HV-ECU) 22 that controls traveling as a whole, a motor-generator control unit (MG-ECU) 23 that controls the first motor-generator 2 and the second motor-generator 3, and an engine control unit (E/G-ECU) 24 that controls the engine 1. The control units 22, 23, and 24 are configured to use a microcomputer as a main body, to perform computations using input data and previously-stored data, and to output the computation results as control command signals.

As the input data input to the ECU 21, for example, the vehicle speed, the accelerator operation amount, the rotation speed of the first motor-generator 2, the rotation speed of the second motor-generator 3, the rotation speed of the ring gear 7 (the rotation speed of the output shaft), the rotation speed of the engine 1, and the SOC of the battery are input to the HV-ECU 22. As the control signals output from the ECU 21, for example, a torque command value of the first motor-generator 2, a torque command value of the second motor-generator 3, a torque command value of the engine 1, an oil pressure command value PC1 of the clutch C1, and an oil pressure command value PB1 of the brake B1 are output from the HV-ECU 22.

The torque command value of the first motor-generator 2 and the torque command value of the second motor-generator 3 are input as control data to the MG-ECU 23. The MG-ECU 23 is configured to perform a computation based on the torque command values and to output current command signals of the first motor-generator 2 and the second motor-generator 3. The engine torque command signal is input as control data to the E/G-ECU 24. The E/G-ECU 24 is configured to perform a computation based on the engine torque command value and to output a throttle opening signal for an electronic throttle valve (not illustrated), an ignition signal for controlling an ignition time, and the like.

As described above, the engine 1, the first motor-generator 2, and the second motor-generator 3 constituting the drive sources of the hybrid vehicle Ve have different power performance or different driving characteristics. For example, the engine 1 can operate in a broad operation range from a low-torque and low-speed range to a high-torque and high-speed range. The energy efficiency of the engine 1 becomes better in an operation range in which the torque and the rotation speed are high to a certain degree. On the contrary, the first motor-generator 2 has characteristics of outputting a large torque at a low rotation speed so as to perform a control of adjusting the rotation speed of the engine 1 or a crank angle or the like at the time of stopping the engine 1 and to output the driving force. The second motor-generator 3 has characteristics that it can operate at a rotation speed higher than that of the first motor-generator 2 so as to output the torque to the driving wheels 11 and the maximum torque is smaller than that of the first motor-generator 2.

In the hybrid vehicle Ve using the engine 1, the first motor-generator 2, and the second motor-generator 3 as the drive sources, the drive sources are effectively used to improve the energy efficiency or the fuel efficiency. That is, as described above, the "engine-driven traveling mode" in which the vehicle travels with the output of the engine 1 and the "motor-driven traveling mode" in which the vehicle travels with at least one output of the first motor-generator 2 and the second motor-generator 3 are selected and set depending on the traveling condition of the hybrid vehicle Ve.

Figure 9:
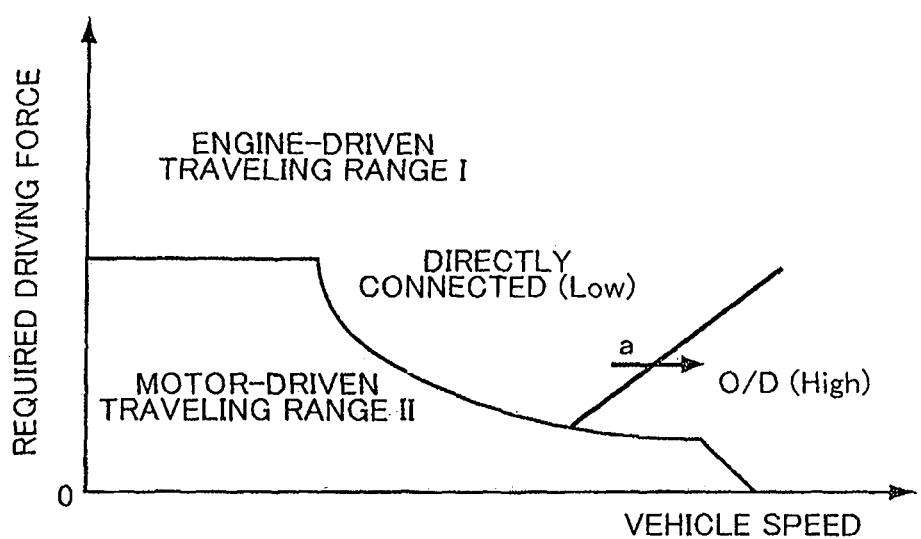
FIG. 9 is a map illustrating used for a driving control of the hybrid vehicle to which the present invention is applied and a transmission gear control of a transmission gear mechanism, where an engine-driven traveling range and a motor-driven traveling range are shown.

The operation ranges in which the traveling modes are set are illustrated in the map of FIG. 9. FIG. 9 is a diagram illustrating the operation ranges of the hybrid vehicle Ve in which the vehicle speed is set as the horizontal axis and the required driving force is set as the vertical axis. The range denoted by reference sign I is an engine-driven traveling range in which the "engine-driven traveling mode" is executed and the range denoted by reference sign II is a motor-driven traveling range in which the "motor-driven traveling mode" is executed. In the engine-driven traveling range I, a threshold value T for partitioning an range in which the transmission gear mechanism 17 is controlled to the directly connected state (Low) and an range in which the transmission gear mechanism 17 is controlled to the O/D state (High) is set. The traveling modes and the transmission gear stages of the transmission gear mechanism 17 are selected and set depending on the driving force required for the hybrid vehicle Ve. For example, as denoted by arrow a in FIG. 9, an operating point determined by the vehicle speed and the required driving force moves from the range of the directly connected state (Low) to the range of the O/D state (High), whereby the transmission gear control of the transmission gear mechanism 17 from the directly connected state (Low) to the O/D state (High) is performed. The ECU 21 is configured to perform the control for switching of the traveling mode depending on the variation in the operation range or switching of the transmission gear stage of the transmission gear mechanism 17.

In the hybrid vehicle Ve illustrated in FIGS. 1, 2, the transmission gear mechanism 17 is constituted by the single-planetary type planetary gear unit 17a. On the other hand, in the present invention, the transmission gear mechanism 17 may be constituted by a double-planetary type planetary gear unit. An example where the transmission gear mechanism 17 is constituted by the double-planetary type planetary gear unit and an example of the drivetrain that can be suitably mounted on an FR type vehicle are illustrated in FIG. 10.

Figure 10:
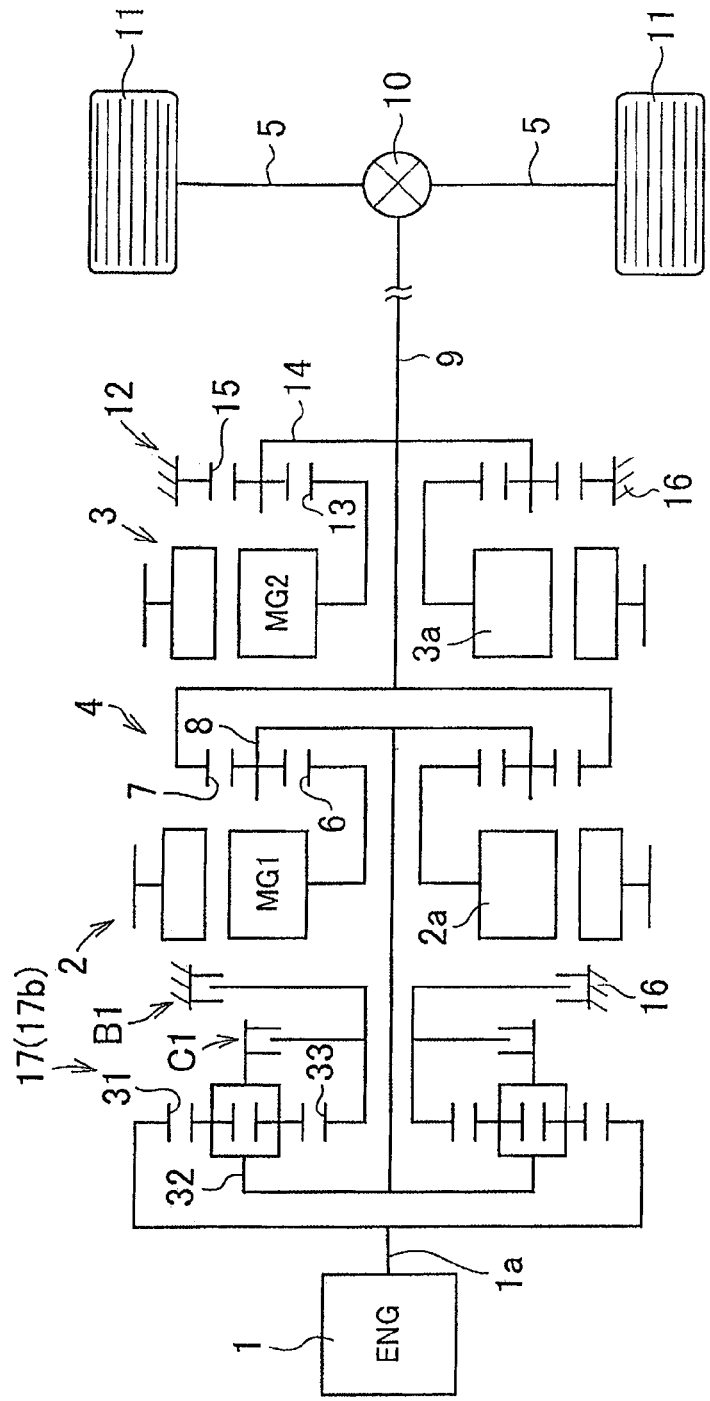
FIG. 10 is a skeleton diagram illustrating a drivetrain of a hybrid vehicle to which the present invention is applied and is a diagram illustrating an example of a drivetrain in which a transmission gear mechanism is constituted by a double-pinion planetary gear unit and which can be suitably mounted on an FR type vehicle.

The hybrid vehicle Ve illustrated in FIG. 10 is different from the hybrid vehicle Ve illustrated in FIG. 1, in the configuration of the transmission gear mechanism 17 and the connection relation between the transmission gear mechanism 17 and the engine 1 and the first motor-generator 2. Specifically, in the example illustrated in FIG. 10, the transmission gear mechanism 17 is constituted by a double-pinion planetary gear unit 17b. A ring gear 31 of the planetary gear unit 17b is connected to the output shaft 1a of the engine 1. A carrier 32 thereof is connected to the carrier 8 of the power split mechanism 4 so as to rotate together. One side of the carrier 32 in the example illustrated in FIG. 10 engages with a sun gear 33, the other side engages with the ring gear 31, and two pinion gears engaging with each other are supported so as to rotate and revolve. A clutch C1 for selectively connecting the sun gear 33 and the carrier 32 is disposed between the sun gear 33 and the carrier 32. A brake B1 for selectively fixing the sun gear 33 so as not to rotate is provided.

In the transmission gear mechanism 17 in the example illustrated in FIG. 10, similarly to the example illustrated in FIG. 1, the sun gear 33 and the carrier 32 of the planetary gear unit 17b are connected to each other by engaging the clutch C1. As a result, the entire planetary gear unit 17b rotates as a unified body and a so-called directly connected state in which an acceleration operation and a deceleration operation are not performed is realized. By engaging the brake B1 in addition to the clutch C1, the entire transmission gear mechanism 17 is fixed as a unified body and the rotations of the carrier 8 of the power split mechanism 4 and the engine 1 are stopped. On the other hand, in the transmission gear mechanism 17 in the example illustrated in FIG. 10, by engaging only the brake B1, the sun gear 33 of the transmission gear mechanism 17 serves as a fixed element and the ring gear 31 serves as an input element. Accordingly, the carrier 32 serving as an output element when the ring gear 31 serves as an input element rotates at a rotation speed higher than that of the ring gear 31 in the same direction as the ring gear 31. Accordingly, the transmission gear mechanism 17 serves as an acceleration mechanism. That is, the transmission gear mechanism 17 is set to the O/D state (High).

Figure 11:
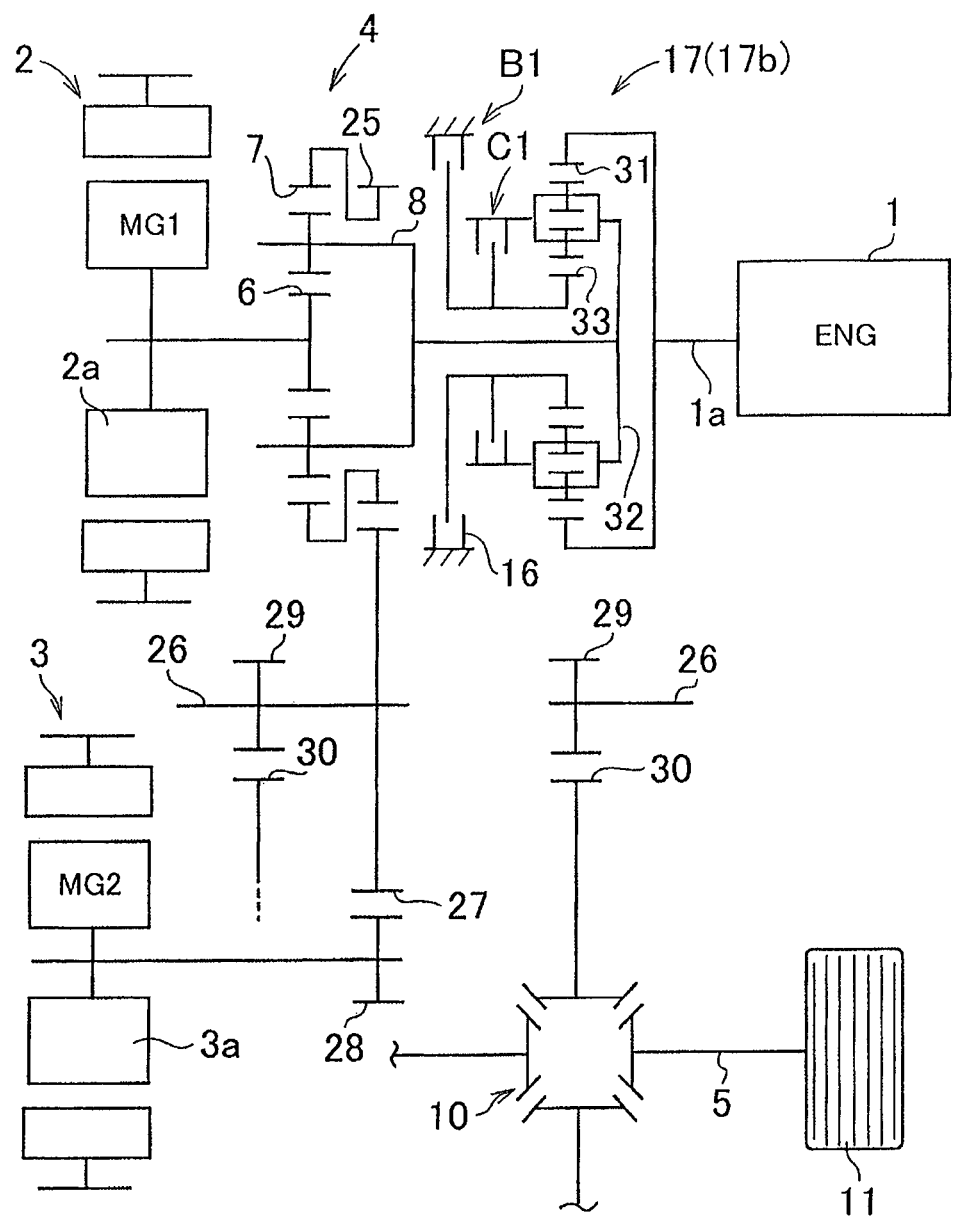
FIG. 11 is a skeleton diagram illustrating a drivetrain of a hybrid vehicle to which the present invention is applied and is a diagram illustrating an example of a drivetrain in which a transmission gear mechanism is constituted by a double-pinion planetary gear unit and which can be suitably mounted on an FF type vehicle.

An example where the transmission gear mechanism 17 is constituted by the double-planetary type planetary gear unit and an example of the drivetrain that can be suitably mounted on an FF type vehicle are illustrated in FIG. 11. The hybrid vehicle Ve illustrated in FIG. 11 is different from the hybrid vehicle Ve illustrated in FIG. 2, in the configuration of the transmission gear mechanism 17 and the connection relation between the transmission gear mechanism 17 and the engine 1 and the first motor-generator 2. The transmission gear mechanism 17 constituted by the double-pinion planetary gear unit 17b and the connection relations between the transmission gear mechanism 17 and the engine 1 and the first motor-generator 2 are the same as the drivetrain of the hybrid vehicle Ve illustrated in FIG. 10.

As described above, in the power transmitting apparatus TM for a hybrid vehicle according to the present invention, the transmission gear mechanism 17 for changing the rotation speed of the engine 1 is disposed between the engine 1 and the power split mechanism 4. Accordingly, compared with a power transmitting apparatus for a hybrid vehicle in the related art not having the configuration of the transmission gear mechanism 17, the assembling work is complicated and the number of assembling processes increases as the number of components of the transmission gear mechanism 17 increases.

Figure 12:
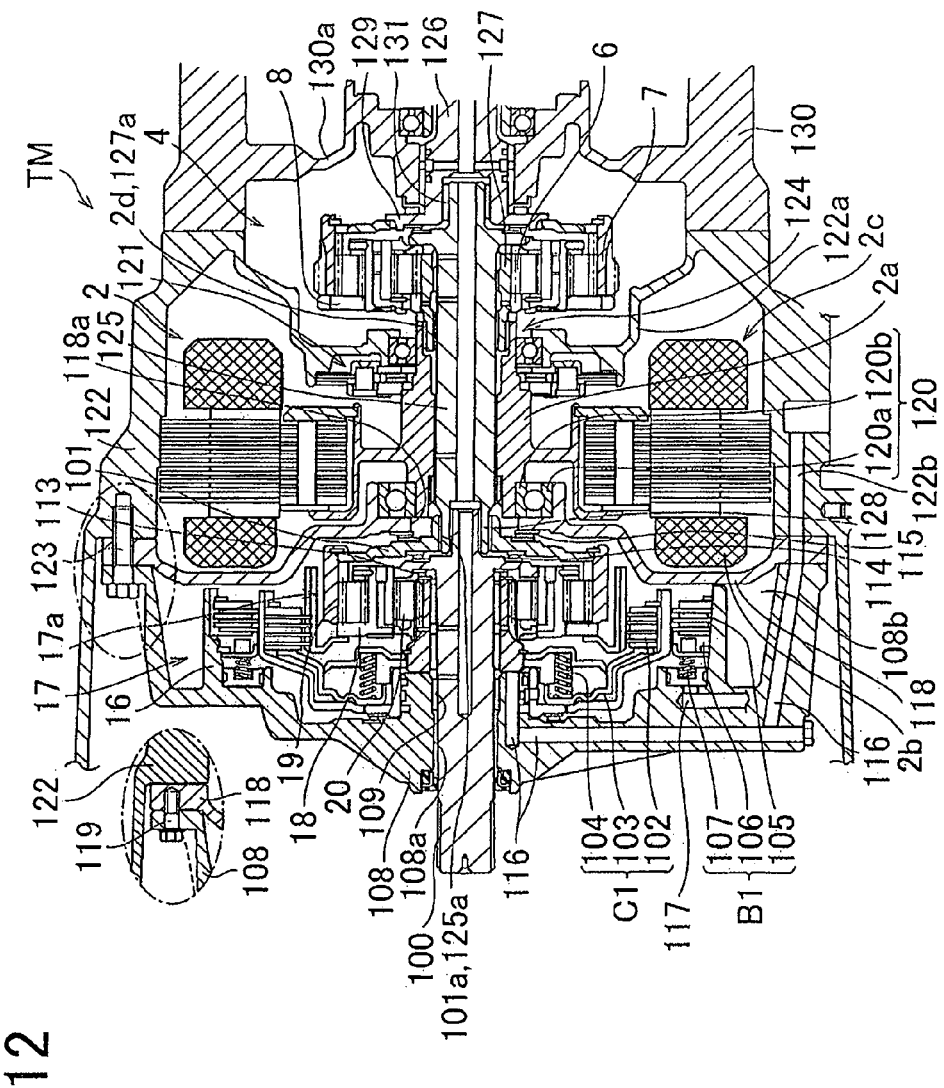
FIG. 12 is a cross-sectional view specifically illustrating a configuration of a power transmitting apparatus for a hybrid vehicle according to the present invention, where the transmission gear mechanism is constituted by a single-pinion planetary gear unit.

Accordingly, in the power transmitting apparatus for a hybrid vehicle according to the present invention, it is possible to simplify the assembly of the apparatus and to improve productivity even when the transmission gear mechanism 17 is added to the configuration in the related art. A specific example of the configuration is illustrated in FIG. 12. The power transmitting apparatus TM illustrated in FIG. 12 corresponds to the configuration of the drivetrain illustrated in FIGS. 1, 2. That is, the transmission gear mechanism 17 is constituted by the single-pinion planetary gear unit 17*a*.

The power transmitting apparatus TM includes a transmission gear mechanism 17, a first motor-generator 2, and a power split mechanism 4. In FIG. 12, the transmission gear mechanism 17, the first motor-generator 2, and the power split mechanism 4 are arranged in the order of the transmission gear mechanism 17, the first motor-generator 2, and the power split mechanism 4 from the side closer to the engine 1 not illustrated, that is, from the front side of the power transmitting apparatus TM. Hereinafter, "front" and "front side" represent the left side in FIG. 12 or 13 and "rear" and "rear side" represent the right side in FIG. 12 or 13.

The transmission gear mechanism 17 includes a single-pinion planetary gear unit 17*a*, a clutch C1, a brake B1, an input shaft 100, and an output flange 101. The clutch C1 includes a frictional member 102 for connecting the sun gear 20 and the carrier 18 of the planetary gear unit 17*a* to each other and a hydraulic actuator 103 and a return spring 104 for causing the frictional member 102 to operate so as to control the clutch C1 to the engaging and disengaging states. The hydraulic actuator 103 is supplied with an oil pressure for engaging the clutch C1 via an oil passage 116 to be described later. On the other hand, the brake B1 includes a frictional member 105 for fixing the sun gear 20 of the planetary gear unit 17*a* so as not to rotate and a hydraulic actuator 106 and a return spring 107 for causing the frictional member 105 to operate so as to control the brake B1 to the engaging and disengaging states. The hydraulic actuator 106 is supplied with an oil pressure for engaging the brake B1 via an oil passage 117 to be described later.

A front cover 108 for housing the planetary gear unit 17*a*, the clutch C1, the brake B1, and the input shaft 100 is provided. The front cover 108 is a member covering a part facing the engine 1 in a state where the power transmitting apparatus TM is completely assembled. In the power transmitting apparatus TM illustrated in FIG. 12, the planetary gear unit 17*a*, the clutch C1, the brake B1, the input shaft 100, and the output flange 101 are disposed inside the front cover 108.

Specifically, the hydraulic actuator 103, the return spring 104, the hydraulic actuator 106, and the return spring 107 are disposed on the front side in the front cover 108, that is, on the side close to the engine 1 not illustrated in FIG. 12 (on the left side in FIG. 12). The planetary gear unit 17*a* is disposed on the inner diameter side in the rear of the hydraulic actuators 103, 106 and the return springs 104, 107.

In the inner circumference of the sun gear 20 of the planetary gear unit 17*a*, the input shaft 100 serving as an input member of the transmission gear mechanism 17 is disposed to rotate relative to the sun gear 20. The input shaft 100 is supported by a needle bearing 109 disposed in the inner circumference of a through-hole 108*a* formed in the front cover 108 and a bush 128 disposed in the inner circumference of a counterbore formed in the input shaft 125 of the power split mechanism 4 to be described later.

A flange 113 rotating together with the input shaft 100 is formed in the input shaft 100, and the carrier 18 of the planetary gear unit 17*a* is connected to the flange 113 so as to rotate together. That is, the input shaft 100 and the carrier 18 are connected to each other so as to rotate together. The front end of the input shaft 100 protrudes from the through-hole 108*a* so as to connect the input shaft 100 to the output shaft 1*a* of the engine 1 via a damper mechanism (not illustrated). The rear end of the input shaft 100 is supported by an input shaft 125 of the power split mechanism 4 to be described later.

In the outer circumference of the rear end of the input shaft 100, an output flange 101 is disposed on the rear side of the flange 113. The output flange 101 serves as an output member of the transmission gear mechanism 17 and is disposed to rotate relative to the input shaft 100. The output flange 101 is supported by a thrust bearing 114 disposed between the output flange 101 and the flange 113 and a thrust bearing 115 disposed between the output flange 101 and an MG1 cover 118 to be described later.

The ring gear 19 of the planetary gear unit 17*a* is connected to the output flange 101 so as to rotate together. A spline hole 101*a* for connecting the output flange 101 to the input shaft 125 of the power split mechanism 4 to be described later is formed at the rear end of the output flange 101. That is, a spline shaft 125*a* is formed at the front end of the input shaft 125 of the power split mechanism 4, and the output flange 101 and the input shaft 125 are fitted to each other by a spline.

The frictional member 102 of the clutch C1 is disposed on the outer circumference side of the hydraulic actuator 103, the return spring 104, and the planetary gear unit 17*a*. A part of the frictional member 102 is connected to the sun gear 20 of the planetary gear unit 17*a* so as to rotate together. The other part of the frictional member 102 is connected to the carrier 18 of the planetary gear unit 17*a* so as to rotate together. The frictional member 105 of the brake B1 is disposed on the outer circumference side of the clutch C1. A part of the frictional member 105 is connected to the sun gear 20 of the planetary gear unit 17*a* so as to rotate together. The other part of the frictional member 105 is fixed to a fixing member 16 formed inside the front cover 108.

The oil passage 116 for supplying a engaging oil pressure to the clutch C1 and the oil passage 117 for supplying a engaging oil pressure to the brake B1 are formed in the front cover 108. The oil passage 116 can be easily formed, for example, by performing a drilling process on three positions in the example illustrated in FIG. 12. Similarly, the oil passage 117 can be easily formed, for example, by performing a drilling process on three positions. The oil passage 116 and the oil passage 117 are configured to be connected to supply oil passages 122*b* formed in an MG1 cover 118 to the described later and the housing 122 by assembling the front cover 108 to the MG1 cover 118 and the housing 122. The supply oil passages 122*b* are supplied with oil pressures for the clutch C1 and the brake B1 from a valve body (not illustrated) side.

The members constituting the transmission gear mechanism 17 such as the planetary gear unit 17*a*, the clutch C1, the brake B1, and the input shaft 100 are housed and assembled in the front cover 108. In the state where the members constituting the transmission gear mechanism 17 are assembled, the MG1 cover 118 is attached to the opening portion on the rear side of the front cover 108. For example, illustrated in FIG. 12, the front cover 108 and the MG1 cover 118 are fixed as a unified body by plural bolts 119. The same through-hole 118*a* as in the front cover 108 is formed in the MG1 cover 118. In a part of the through-hole 118*a*, the input shaft 100 of the transmission gear mechanism 17 and the input shaft 125 of the power split mechanism 4 to be described later are connected to each other so as to relatively rotate, and the output flange 101 of the transmission gear mechanism 17 and the input shaft 125 of the power split mechanism 4 to be described later are fitted by a spline.

The MG1 cover 118 is formed along the shape of the front (left in FIG. 12) end of the first motor-generator 2. Accordingly, a part of the outer circumference of the MG1 cover 118 is formed to correspond to the front end of a coil end 2b of the first motor-generator 2, and the central part of the MG1 cover 118 having the through-hole 118a formed therein has a shape invading the inner circumference of the coil end 2b or a stator 2c. That is, as illustrated in the cross-sectional view of FIG. 12, the central part of the MG1 cover 118 protrudes to the right side in FIG. 12 and the through-hole 118a is located on the inner circumference of the first motor-generator 2. Accordingly, the output flange 101 of the transmission gear mechanism 17 and the input shaft 125 of the power split mechanism 4 are connected to each other by a spline on the inner circumference of the first motor-generator 2.

In this way, in the power transmitting apparatus TM according to the present invention, the transmission gear mechanism 17 and the power split mechanism 4 are arranged effectively using the space of the inner circumference of the first motor-generator 2. Accordingly, it is possible to shorten the entire length in the rotation axis direction of the power transmitting apparatus TM and to achieve a decrease in size and weight of the power transmitting apparatus TM.

In the example illustrated in FIG. 12, a space 108b is formed between the outer circumference of the fixing member 16 to which the frictional member 105 of the brake B1 is fixed and the inner circumference of the front cover 108. The space 108b effectively serves as an oil return path or an oil reservoir of the oil supplied to the transmission gear mechanism 17.

A ball bearing 120 for supporting the front end of the rotor 2a of the first motor-generator 2 is attached to the side surface on the rear side of the MG1 cover 118. Specifically, an outer race 120a of the ball bearing 120 is fixed to the MG1 cover 118. By attaching the MG1 cover 118, which has been fixed as a unified body to the front cover 108, to the housing 122 housing the first motor-generator 2 to be described later, the rotor 2a is incorporated into an inner race 120b of the ball bearing 120. The end on the rear side of the rotor 2a is supported by a ball bearing 124 to be described later.

As described above, the transmission gear mechanism 17 is formed as a single unit in a state where the members constituting the transmission gear mechanism 17 such as the planetary gear unit 17a, the clutch C1, the brake B1, and the input shaft 100 are incorporated into the front cover 108 and are covered with the MG1 cover 118. That is, the transmission gear mechanism 17 in the present invention can be formed as a transmission gear unit covered with the front cover 108 and the MG1 cover 118 and the transmission gear unit can be treated as a sub-assembly.

The housing 122 for housing the first motor-generator 2, a resolver 121, and the like is disposed on the rear side of the front cover 108 and the MG1 cover 118 housing the transmission gear mechanism 17. That is, the front cover 108 and the MG1 cover 118 housing the transmission gear mechanism 17 to form the transmission gear unit as described above are fixed to the front side of the housing 122. For example, as illustrated in FIG. 12, the front cover 108, the MG1 cover 118, and the housing 122 are fixed as a unified body by plural bolts 123.

The housing 122 is opened to the front side, that is, the MG1 cover 118 side (the left side in FIG. 12) and the resolver 121 is attached to the inside of a side wall portion 122a on the rear side of the housing 122. A through-hole is formed in the side wall portion 122a and the ball bearing 124 is attached to the inner circumference of the through-hole. The stator 2c of the first motor-generator 2 is fixed to the inside of the housing 122 on the front side of the resolver 121.

The rotor 2a of the first motor-generator 2 is inserted into the inner circumference of the stator 2c. The front end of the rotor 2a is supported on the MG1 cover 118 by the ball bearing 120 by assembling the housing 122, the front cover 108, and the MG1 cover 118 as a unified body as described above. On the other hand, the rear end of the rotor 2a is supported on the housing 122 by the ball bearing 124. A spline hole 2d for connecting the rotor 2a to the sun gear 6 of the power split mechanism 4 so as to enable power transmission is formed at the rear end of the rotor 2a. That is, a spline shaft 127a is formed in a flange 127 connected as a unified body to the sun gear 6 of the power split mechanism 4 to be described later, and the rotor 2a and the flange 127 are fitted by a spline.

The power split mechanism 4 is disposed in the housing 122 housing the first motor-generator 2. The power split mechanism 4 is constituted by a single-pinion planetary gear unit as described above, and includes the input shaft 125 to which the carrier 8 thereof is connected so as to rotate together and the output shaft 126 to which the ring gear 7 thereof is connected so as to rotate together. The flange 127 is connected to the sun gear 6 of the power split mechanism 4 so as to rotate together. The spline shaft 127a is formed on the outer circumference of the front end of the flange 127. The flange 127 and the rotor 2a of the first motor-generator 2 having the spline hole 2d formed therein are fitted to each other by a spline. That is, the sun gear 6 of the power split mechanism 4 is connected to the rotor 2a of the first motor-generator 2 by a spline so as to rotate together.

The input shaft 125 is inserted into the inner circumference of the sun gear 6 and the flange 127 so as to rotate relative to the sun gear 6 of the power split mechanism 4 and the flange 127. A part on the front side of the input shaft 125 protrudes from the flange 127 and the part protruding from the flange 127 is inserted into the inner circumference of the rotor 2a so as to rotate relative to the rotor 2a. A spline shaft 125a is formed on the outer circumference of the front end of the input shaft 125. The input shaft 125 and the output flange 101 of the transmission gear mechanism 17 having the spline hole 101a formed therein are fitted to each other by a spline. That is, the output flange 101 as the output member of the transmission gear mechanism 17 and the input shaft 125 as the input member of the power split mechanism 4 are connected to each other by a spline so as to rotate together. The output flange 101 and the input shaft 125 may be connected to each other by a serration instead of the spline.

A counterbore for supporting the rear (right in FIG. 12) end of the input shaft 100 of the transmission gear mechanism 17 so as to relatively rotate is formed at the front end of the input shaft 125. A bush 128 is formed between the rear end of the input shaft 100 and the counterbore formed at the front end of the input shaft 125.

A flange 129 rotating together with the output shaft 126 is formed at the front end of the output shaft 126, and the ring gear 7 of the power split mechanism 4 is connected to the flange 129 so as to rotate together. That is, the output shaft 126 and the ring gear 7 are connected so as to rotate together.

On the other hand, the rear end of the output shaft 126 is connected to the propeller shaft 9, which is not illustrated in FIG. 12, so as to rotate together. The part on the rear side of the output shaft 126 is supported on a case 130 attached to the rear side of the housing 122. That is, a through-hole is formed in a side wall portion 130a on the front side of the case 130 and the part on the rear side of the output shaft 126 is inserted into the through-hole of the side wall portion 130a. The output shaft 126 is supported on the inner circumference of the through-hole of the side wall portion 130a.

A counterbore for supporting the rear end of the input shaft 125 of the power split mechanism 4 so as to relatively rotate is formed at the front end of the output shaft 126. A bush 131 is disposed between the rear end of the input shaft 125 and the counterbore formed at the front end of the output shaft 126.

The example describes the configuration in which the ring gear 7 of the power split mechanism 4 is connected to the propeller shaft 9 via the output shaft 126, that is, the configuration in which the power transmitting apparatus TM according to the present invention is applied to the drivetrain that can be suitably mounted on the FR type vehicle illustrated in FIG. 1. On the other hand, when the power transmitting apparatus TM according to the present invention is applied to the drivetrain that can be suitably mounted on the FF type vehicle illustrated in FIG. 2, the ring gear 7 of the power split mechanism 4 is connected to the drive gear 25 constituting the gear train 12 via the output shaft 126 so as to rotate together. The other configuration may be the same as in the example illustrated in FIG. 12.

Figure 13:
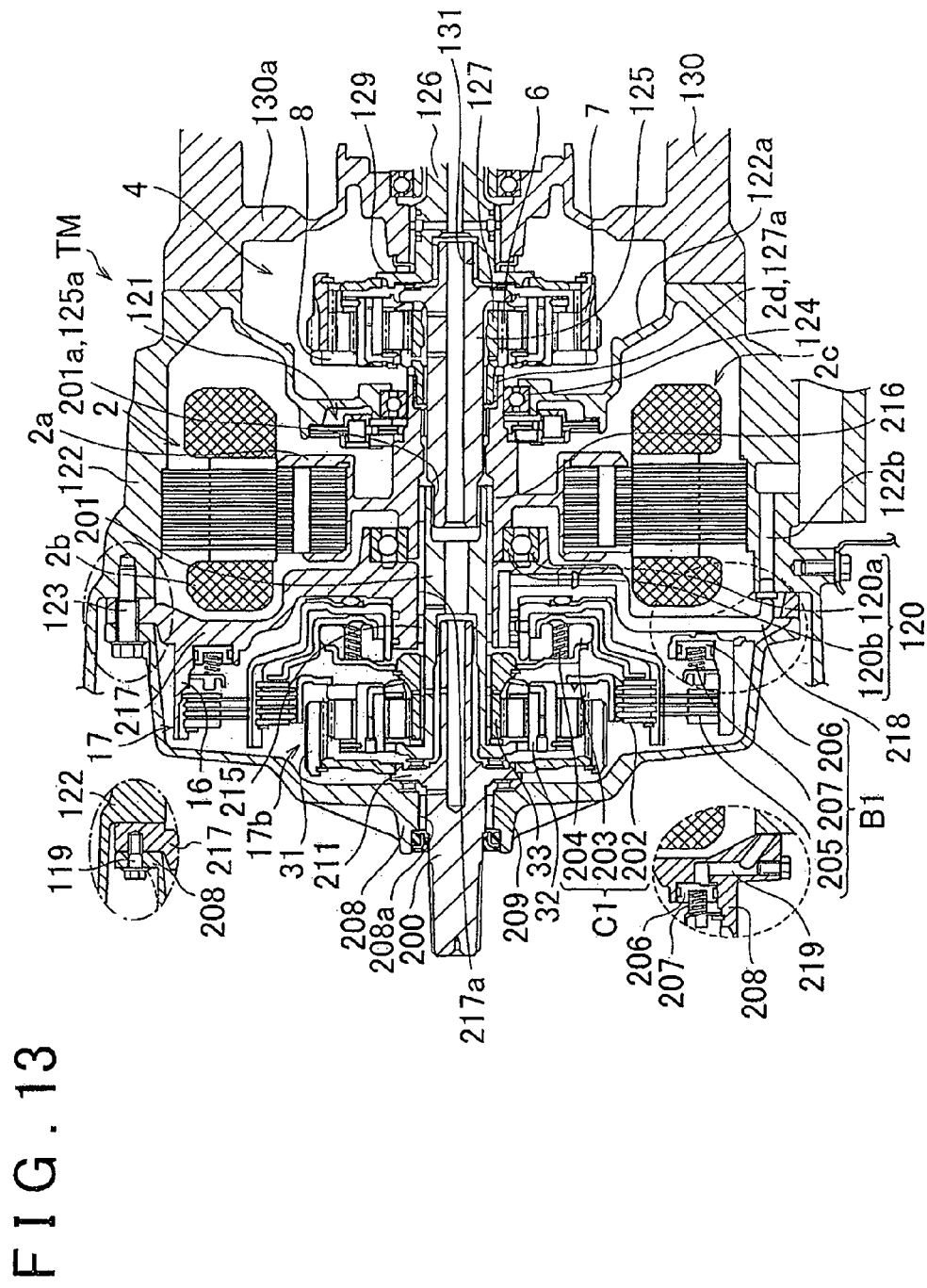
FIG. 13 is a cross-sectional view specifically illustrating the configuration of the power transmitting apparatus for the hybrid vehicle according to the present invention, where the transmission gear mechanism is constituted by a double-pinion planetary gear unit.

FIG. 13 illustrates another configuration example of the power transmitting apparatus according to the present invention. The power transmitting apparatus TM illustrated in FIG. 13 corresponds to the drivetrain illustrated in FIGS. 10, 11. That is, the transmission gear mechanism 17 is constituted by the double-pinion planetary gear unit 17b.

In FIG. 13, the power transmitting apparatus TM includes a transmission gear mechanism 17, a first motor-generator 2, and a power split mechanism 4, similarly to the configuration illustrated in FIG. 12. In FIG. 13, the transmission gear mechanism 17, the first motor-generator 2, and the power split mechanism 4 are arranged in this order from the side close to the engine 1 not illustrated, that is, from the front side of the power transmitting apparatus TM.

In the configuration illustrated in FIG. 13, the transmission gear mechanism 17 is constituted by a double-pinion planetary gear unit 17b, a clutch C1, a brake B1, an input shaft 200, and an intermediate shaft 201. The clutch C1 includes a frictional member 202 for connecting the sun gear 33 and the carrier 32 of the planetary gear unit 17b to each other and a hydraulic actuator 203 and a return spring 204 for causing the frictional member 202 to operate so as to control the clutch C1 to the engaging and disengaging states. The hydraulic actuator 203 is supplied with an oil pressure for engaging the clutch C1 via an oil passage 218 to be described later. On the other hand, the brake B1 includes a frictional member 205 for fixing the sun gear 33 of the planetary gear unit 17b so as not to rotate and a hydraulic actuator 206 and a return spring 207 for causing the frictional member 205 to operate so as to control the brake B1 to the engaging and disengaging states. The hydraulic actuator 206 is supplied with an oil pressure for engaging the brake B1 via an oil passage 219 to be described later.

A front cover 208 for housing the planetary gear unit 17b, the clutch C1, the brake B1, and the input shaft 200 is provided. The front cover 208 is a member covering a part facing the engine 1 in a state where the power transmitting apparatus TM is completely assembled. In the power transmitting apparatus TM illustrated in FIG. 13, the planetary gear unit 17b, the clutch C1, the brake B1, the input shaft 200, and the intermediate shaft 201 are disposed inside the front cover 208.

Specifically, the planetary gear unit 17b is disposed on the front side in the front cover 208, that is, on the side close to the engine 1 not illustrated in FIG. 13 (on the left side in FIG. 13). In the inner circumference of the sun gear 33 of the planetary gear unit 17b, the input shaft 200 serving as an input member of the transmission gear mechanism 17 is disposed to rotate relative to the sun gear 33 and the intermediate shaft 201. The input shaft 200 is supported by a needle bearing 209 disposed on the inner circumference of a through-hole 208a formed in the front cover 208 and a bush 210 disposed on the inner circumference of the intermediate shaft 201 as described later. The hydraulic actuator 203, the return spring 204, the hydraulic actuator 206, and the return spring 207 are attached to the rear side of the planetary gear unit 17b.

A flange 211 rotating together with the input shaft 200 is formed in the input shaft 200, and the ring gear 31 of the planetary gear unit 17b is connected to the flange 211 so as to rotate together. That is, the input shaft 200 and the ring gear 31 are connected to each other so as to rotate together. The front end of the input shaft 200 protrudes from the through-hole 208a so as to connect the input shaft 200 to the output shaft 1a of the engine 1 via a damper mechanism (not illustrated). The rear end of the input shaft 200 is supported by the intermediate shaft 201 as described later. The part on the rear side from the flange 211 of the input shaft 200 has an outer diameter smaller than that of the other part so as to be inserted into the counterbore formed in the intermediate shaft 201.

In addition to the input shaft 200, the intermediate shaft 201 serving as an output member of the transmission gear mechanism 17 is disposed on the inner circumference of the sun gear 33 of the planetary gear unit 17b so as to rotate relative to the input shaft 200 and the sun gear 33. The intermediate shaft 201 is disposed on the same rotation axis as the input shaft 200 on the rear side of the input shaft 200. The intermediate shaft 201 is supported by a needle bearing 215 disposed on the inner circumference of a through-hole 217a formed in an MG1 cover 217 to be described later and a needle bearing 216 disposed on the inner circumference of the rotor 2a of the first motor-generator 2.

The carrier 32 of the planetary gear unit 17b is connected to the intermediate shaft 201 so as to rotate together. A counterbore for supporting a small-diameter portion on the rear side of the input shaft 200 so as to relatively rotate is formed at the front end of the intermediate shaft 201. A bush 210 is formed between the rear end of the input shaft 200 and the counterbore formed at the front end of the intermediate shaft 201. A spline hole 201a for connecting the intermediate shaft 201 and the input shaft 125 of the power split mechanism 4 so as to enable power transmission is formed at the rear end of the intermediate shaft 201. That is, a spline shaft 125a is formed at the front end of the input shaft 125 of the power split mechanism 4 and the intermediate shaft 201 and the input shaft 125 are fitted to each other by a spline. Accordingly, the intermediate shaft 201 as the output member of the transmission gear mechanism 17 and the input shaft 125 as the input member of the power split mechanism 4 are connected to each other by a spline so as to rotate together. The intermediate shaft 201 and the input shaft 125 may be connected to each other by a serration instead of the spline.

The frictional member 202 of the clutch C1 is disposed on the outer circumference of the hydraulic actuator 203, the return spring 204, and the planetary gear unit 17*b*. A part of the frictional member 202 is connected to the sun gear 33 of the planetary gear unit 17*b* so as to rotate together. The other part of the frictional member 202 is connected to the carrier 32 of the planetary gear unit 17*b* so as to rotate together. The frictional member 205 of the brake B1 is disposed on the outer circumference of the clutch C1. A part of the frictional member 205 is fixed to the fixing member 16 formed in the MG1 cover 217.

The members constituting the transmission gear mechanism 17 such as the planetary gear unit. 17*b*, the clutch C1, the brake B1, the input shaft 200, and the intermediate shaft 201 are housed and assembled in the front cover 208. In the state where the members constituting the transmission gear mechanism 17 are assembled, the MG1 cover 217 is attached to the opening portion on the rear side of the front cover 208. For example, as illustrated in FIG. 13, the front cover 208 and the MG1 cover 217 are fixed as a unified body by plural bolts 119. A through-hole 217*a* as in the front cover 208 is formed in the MG1 cover 217. The intermediate shaft 201 is inserted into the inner circumference of the through-hole 217*a*. The rear end of the intermediate shaft 201 having the spline hole 201*a* formed therein protrudes from the through-hole 217*a* to the rear side so as to be fitted to the input shaft 125 of the power split mechanism 4 by a spline on the inner circumference of the rotor 2*a* of the first motor-generator 2.

The MG1 cover 217 is formed along the shape of the front (left in FIG. 13) end of the first motor-generator 2. Accordingly, a part of the outer circumference of the MG1 cover 217 is formed to correspond to the front end of the coil end 2*b* of the first motor-generator 2, and the central part of the MG1 cover 217 having the through-hole 217*a* formed therein has a shape invading the inner circumference of the coil end 2*b* or the stator 2*c*. That is, as illustrated in the cross-sectional view of FIG. 13, the central part of the MG1 cover 217 protrudes to the right side in FIG. 13 and the through-hole 217*a* is located on the inner circumference of the first motor-generator 2. Accordingly, the intermediate shaft 201 of the transmission gear mechanism 17 and the input shaft 125 of the power split mechanism 4 are connected to each other by a spline on the inner circumference of the first motor-generator 2.

In the example illustrated in FIG. 13, similarly to the example illustrated in FIG. 12, in the power transmitting apparatus TM according to the present invention, the transmission gear mechanism 17 and the power split mechanism 4 are arranged effectively using the space of the inner circumference of the first motor-generator 2. Accordingly, it is possible to shorten the entire length in the rotation axis direction of the power transmitting apparatus TM and to achieve a decrease in size and weight of the power transmitting apparatus TM.

In the example illustrated in FIG. 13, the oil passage 218 for supplying a engaging oil pressure to the clutch C1 and the oil passage 219 for supplying a engaging oil pressure to the brake B1 are formed in the MG1 cover 217. The oil passage 218 is formed by fixing or holding a tubular member, which is formed in a predetermined shape corresponding to the shape of the MG1 cover 217, to the inner side surface (the left side in FIG. 13) of the MG1 cover 217. On the other hand, the oil passage 219 can be easily formed, for example, by performing a drilling process on three positions. The oil passage 218 and the oil passage 219 are connected to the supply oil passages 122*b* formed in the MG1 cover 217 and the housing 122 by assembling the front cover 208, the MG1 cover 217, and the housing 122. The supply oil passages 122*b* are supplied with oil pressures for controlling the clutch C1 and the brake B1 from a valve body (not illustrated).

A ball bearing 120 for supporting the front end of the rotor 2*a* of the first motor-generator 2 is attached to the side surface on the rear side of the MG1 cover 217. Specifically, an outer race 120*a* of the ball bearing 120 is fixed to the MG1 cover 217. By attaching the MG1 cover 217, which has been fixed as a unified body to the front cover 208, to the housing 122 housing the first motor-generator 2, the rotor 2*a* is incorporated into an inner race 120*b* of the ball bearing 120.

As described above, the transmission gear mechanism 17 is formed as a single unit in a state where the members constituting the transmission gear mechanism 17 such as the planetary gear unit 17*b*, the clutch C1, the brake B1, the input shaft 200, and the intermediate shaft 201 are incorporated into the front cover 208 and are covered with the MG1 cover 217. That is, the transmission gear mechanism 17 in the present invention can be formed as a transmission gear unit covered with the front cover 208 and the MG1 cover 217 and the transmission gear unit can be treated as a sub-assembly.

The housing 122 for housing the first motor-generator 2, the resolver 121, and the like is disposed on the rear side of the front cover 208 and the MG1 cover 217 housing the transmission gear mechanism 17. That is, the front cover 208 and the MG1 cover 217 housing the transmission gear mechanism 17 to form the transmission gear unit as described above are fixed to the front side of the housing 122. For example, as illustrated in FIG. 13, the front cover 208, the MG1 cover 217, and the housing 122 are fixed as a unified body by plural bolts 123. The configuration on the rear side of the front cover 208 and the MG1 cover 217, that is, the configuration on the rear side of the housing 122, is the same as the configuration illustrated in FIG. 12.

The assembling procedure of the power transmitting apparatus TM illustrated in FIG. 12 or 13 will be described below. First, the bearing 124 and the resolver 121 are attached to the inside of the housing 122. Subsequently, the stator 2*c* of the first motor-generator 2 is attached. Then, the rotor 2*a* of the first motor-generator 2 is incorporated into the inner circumference of the stator 2*c*.

Independently of attachment of the resolver 121 or the first motor-generator 2 into the housing 122, the transmission gear unit is assembled. That is, the clutch C1 and the brake B1 are attached to the inside of the front cover 108. Subsequently, the planetary gear unit 17*a*, the input shaft 100, and the output flange 101 are attached. Then, the MG1 cover 118 is attached to cover the front cover 108. Accordingly, in the state where the transmission gear mechanism 17 is covered with the front cover 108 and the MG1 cover 118, the transmission gear mechanism 17 is assembled as the transmission gear unit. Alternatively, the planetary gear unit 17*b*, the input shaft 200, and the intermediate shaft 201 are attached to the inside of the front cover 208. Subsequently, the clutch C1 and the brake B1 are attached. Then, the MG1 cover 217 is attached to cover the front cover 208. Accordingly, in the state where the transmission gear mechanism 17 is covered with the front cover 208 and the MG1 cover 217, the transmission gear mechanism 17 is assembled as the transmission gear unit.

The transmission gear unit, that is, transmission gear mechanism 17 attached into the front cover 108 and the MG1 cover 118 or the transmission gear mechanism 17 attached into the front cover 208 and the MG1 cover 217, is attached into the housing 122 housing the resolver 121 and the first motor-generator 2. That is, the transmission gear unit having the transmission gear mechanism 17 incorporated therein is attached to the left side of the housing 122 in FIG. 12 or 13.

In the state where the transmission gear unit is attached into the housing 122 as described above, the first motor-generator 2 can be inspected. Specifically, a dummy shaft (not illustrated) having the same spline shaft 127a instead of the flange 127 of the power split mechanism 4 having the spline shaft 127a formed therein is fitted into the spline hole 2d formed at the rear end (the right side in FIGS. 12, 13) of the rotor 2a of the first motor-generator 2. By connecting the dummy shaft to a predetermined measuring instrument and causing the first motor-generator 2 to test-operate, it is possible to check the operation of the first motor-generator 2, to easily adjust the resolver 121, or the like.

The power split mechanism 4 is attached to the housing 122 having the transmission gear unit attached thereto. Specifically, the power split mechanism 4 is attached from the right side of the housing 122 in FIG. 12 or 13. In the power split mechanism 4, the input shaft 125, the flange 127, the output shaft 126, and the like are attached to the planetary gear unit in advance. The input shaft 125 of the power split mechanism 4 is inserted into the inner circumference of the rotor 2a of the first motor-generator 2 attached to the housing 122. The spline shaft 125a formed in the input shaft 125 and the spline hole 101a formed in the output flange 101 of the transmission gear mechanism 17 are fitted to each other by a spline. Alternatively, the spline shaft 125a formed in the input shaft 125 and the spline hole 201a formed in the intermediate shaft 201 of the transmission gear mechanism 17 are fitted to each other by a spline. That is, the output member of the transmission gear mechanism 17 and the input member of the power split mechanism 4 are connected to each other by a spline.

Thereafter, the case 130 is attached to the rear end of the housing 122. By attaching the case 130 to the housing 122, the output shaft 126 of the power split mechanism 4 is supported and the assembling of the power transmitting apparatus TM is completed.

As described above, in the power transmitting apparatus TM according to the present invention, the transmission gear mechanism 17 for changing the rotation speed of the engine 1 is disposed between the engine 1 and the power split mechanism 4. In the power transmitting apparatus TM, the output member of the transmission gear mechanism 17 and the input member of the power split mechanism 4 are connected to each other by a spline (or serration). Accordingly, in the power transmitting apparatus TM according to the present invention, the power split mechanism 4 and the transmission gear mechanism 17 can be easily connected so as to enable power transmission by causing the power split mechanism 4 and the transmission gear mechanism 17 to relatively move in the rotation axis direction at the time of assembling the power transmitting apparatus TM.

Particularly, in the power transmitting apparatus TM according to the present invention, the transmission gear mechanism 17, the input member, the output member, and the like are assembled as a single transmission gear unit to the housing 122 that houses the power split mechanism 4, the first motor-generator 2, and the like and that is an important part of the power transmitting apparatus TM. Accordingly, by attaching the transmission gear unit housing the transmission gear mechanism 17 to the housing 122 housing the power split mechanism 4, the first motor-generator 2, and the like from the rear side in the rotation axis direction, the housing 122 and the transmission gear unit can be easily attached to each other.

In this case, a spline (or serration) is formed in the connecting part between the output member of the transmission gear mechanism 17 and the input member of the power split mechanism 4 as described above. Accordingly, the output member of the transmission gear mechanism 17 and the input member of the power split mechanism 4 can be easily and satisfactorily engaged to each other. As a result, it is possible to improve assemblability or productivity of the power transmitting apparatus TM including the transmission gear mechanism 17 and the power split mechanism 4.

In the above-mentioned specific examples, a configuration of a so-called two-motor hybrid vehicle including the engine 1, the first motor-generator 2, and the second motor-generator 3 as the drive sources is described as the hybrid vehicle to which the present invention is applied, but, for example, a hybrid vehicle including the engine and three or more motor-generators may be employed. A so-called plug-in hybrid vehicle in which a battery can be directly charged with an external power supply may be employed.

What is claimed is:

1. A power transmitting apparatus for a hybrid vehicle including an engine and at least one rotary machine as drive sources, the power transmitting apparatus comprising:
    a power split mechanism constituted by a differential device, the power split mechanism configured to split or combine and transmit dynamic power between the drive sources and a drive shaft, the differential device including three rotation elements, and the three rotation elements including:
        a first rotation element that is connected to a first input member,
        a second rotation element that is connected to the rotary machine, and
        a third rotation element that is connected to the drive shaft via a first output member;
    a transmission gear mechanism configured to change a rotation speed of the engine input via a second input member, the transmission gear mechanism being configured to transmit a torque to the first input member and the first rotation element via a second output member, the transmission gear mechanism and the power split mechanism being disposed on a same rotation axis as an output shaft of the engine, the transmission gear mechanism and the power split mechanism being arranged in the order of the transmission gear mechanism and the power split mechanism from a side closer to the engine, and the second output member and the first input member being connected to each other by one of a spline and a serration;
    a front cover that covers an engine side of the transmission gear mechanism;
    a rotary machine cover that covers a power split mechanism side of the transmission gear mechanism; and
    a housing that houses the power split mechanism and the rotary machine, wherein
    the transmission gear mechanism is housed in the front cover and the transmission gear mechanism is covered with the front cover and the rotary machine cover, the transmission gear mechanism, the front cover, and the rotary machine cover constitute a transmission gear unit, the second input member is supported by the front cover and the first input member or the second input member is supported by the front cover and the second output member, and the transmission gear unit is attached to an end on the transmission gear mechanism side of the housing.

2. The power transmitting apparatus according to claim 1, wherein the second output member includes a flange member, the flange member is disposed at an end on the power split mechanism side of the second output member, and the flange member includes one of a spline hole, a serration hole, a spline shaft and a serration shaft, and the first input member includes a shaft member, the shaft member is disposed at an end on the transmission gear mechanism side of the first input member, and the shaft member supports an end on the power split mechanism side of the second input member so as to rotate relative to the first input member and the shaft member includes one corresponding to the flange member out of following four members:

a spline shaft fitted to the spline hole of the second output member;

a serration shaft fitted to the serration hole of the second output member;

a spline hole fitted to the spline shaft of the second output member; and a serration hole fitted to the serration shaft of the second output member.

3. The power transmitting apparatus according to claim 1, wherein the second output member includes a second shaft member, the second shaft member is disposed at an end on the power split mechanism side of the second output member, and the second shaft member includes one of a spline hole, a serration hole, a spline shaft and a serration shaft and the shaft member supports a part on the power split mechanism of the second input member so as to relatively rotate, and the first input member includes a first shaft member, the first shaft member is disposed at an end on the transmission gear mechanism side of the first input member, and the first shaft member includes one corresponding to the second shaft member out of following four members:

a spline shaft fitted to the spline hole of the second output member;

a serration shaft fitted to the serration hole of the second output member;

a spline hole fitted to the spline shaft of the second output member; and a serration hole fitted to the serration shaft of the second output member.

4. The power transmitting apparatus according to claim 1, wherein the transmission gear mechanism includes:

a planetary gear unit that is of a single planetary gear unit and that includes a carrier, a ring gear, and a sun gear;

a clutch that selectively connects the sun gear and the carrier to each other; and a brake that selectively fixes the sun gear so as not to rotate, the ring gear is connected to the second output member so as to rotate together, the carrier is connected to the second input member so as to rotate together, and an end on the power split mechanism side of the second input member is supported by an inner circumferential portion of an end on the transmission gear mechanism side of the first input member so as to relatively rotate.

5. The power transmitting apparatus according to claim 1 wherein the transmission gear mechanism includes:

a planetary gear unit that is of a double planetary gear unit and that includes a carrier, a ring gear, and a sun gear;

a clutch that selectively connects the sun gear and the carrier to each other; and a brake that selectively fixes the sun gear so as not to rotate, the second output member is disposed on an inner circumferential portion of the sun gear so as to rotate relative to the sun gear, the carrier is connected to the second output member so as to rotate together, the ring gear is connected to the second input member so as to rotate together, and the end on the power split mechanism side of the second input member is supported by an inner circumferential portion of the end on the engine side of the second output member so as to relatively rotate.

6. The power transmitting apparatus according to claim 1, wherein the rotary machine includes an inner-rotor electric motor including a rotor with a hollow structure, the rotary machine is disposed on the same rotation axis as the output shaft of the engine, and the rotary machine is disposed between the transmission gear mechanism and the power split mechanism, the first input member is supported by an inner circumferential portion of the rotor so as to relatively rotate, and the second output member and the first input member are connected to each other in an inner circumferential portion of the inner-rotor electric motor.

* * * * *